Nov. 29, 1949            A. G. THOMAS            2,490,009

ELECTROMAGNETIC DEVICE

Filed Jan. 17, 1946

*Albert G. Thomas* INVENTOR.

Patented Nov. 29, 1949

2,490,009

UNITED STATES PATENT OFFICE 2,490,009

ELECTROMAGNETIC DEVICE

Albert G. Thomas, Alexandria, Va.

Application January 17, 1946, Serial No. 641,695

5 Claims. (Cl. 171—212)

1

This invention relates to electrical devices and has particular reference to homopolar or acylic generators and motors.

For electro-plating and for other purposes it is advantageous to use continuous unidirectional current substantially free from ripple. In order to obtain current of this kind it has, heretofore, been necessary to use batteries, elaborate filter systems, or generators having complicated commutating devices.

It is an object, therefore, to provide a generator of relatively simple construction that will produce continuous direct current without appreciable ripple.

A further object is to provide a continuous current electrical generator or motor which will not require brushes.

An additional object is the provision of a continuous current generator using a moving fluid as a generating element.

Another object is the provision of a generator in which a plurality of electromotive forces developed in a conductor or conductors will add to produce the total output electromotive force, without commutation.

Other objects will appear in the following description.

Figure 1:
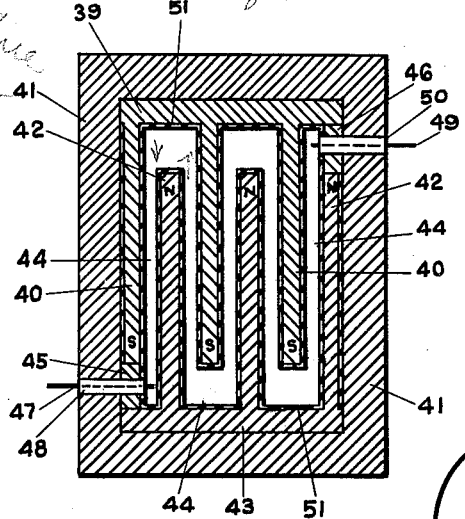
Figure 1 is a plan view of interleaved magnetic field elements attached to a casing of a fluid type continuous current generator.
Figure 2:
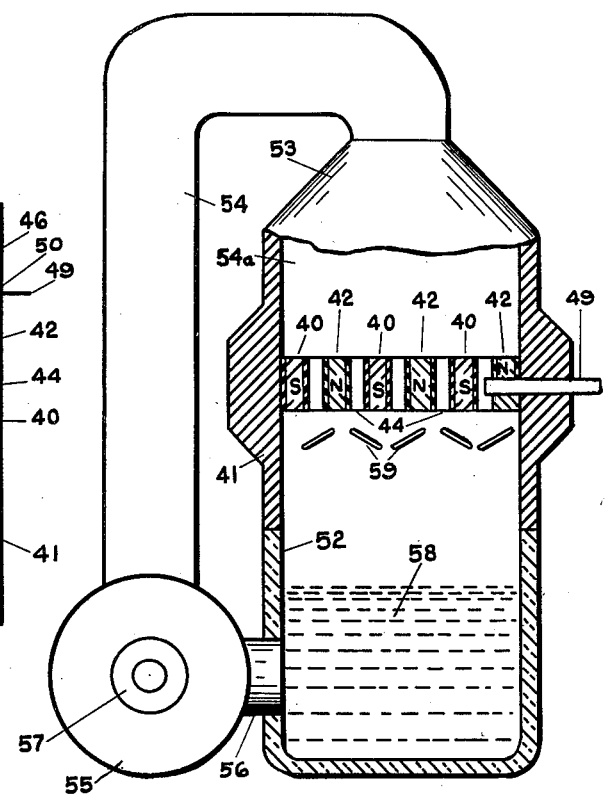
Figure 2 is a front elevation in part section, of a continuous current generator incorporating the magnetic field elements of Figure 1 and a fluid pumping system.

In Figures 1 and 2, iron or steel magnet 39 having a plurality of elongated pole pieces 40, is integral with or attached to heavy band 41 of similar material, preferably. Magnet 43, which may be considered as a part of magnet 39, has pole pieces 42 extending between the other pole pieces as shown, to form continuous channel 44. This channel is relatively narrow except for the spaces near the pole ends which spaces may be wider in order to distribute the flux to better advantage, although this is not essential. Furthermore, the pole pieces may, if desired, be of tapered dimensions in order to produce more or less uniform magnetic flux traversing the channel from pole to pole.

The magnets 39 and 43 are separated by blocks 45 and 46 of brass, or other non-magnetic material which may be of insulating character. Electrode or conductor 47 passes through insulating bushings 48 nested in openings in band 41 and block 45. This electrode extends into channel 44 to make contact with an electrolyte passing through the channel. Similarly, electrode 49 extends into the other end of channel 44, through insulating bushing 50. These bushings fit tightly around the conductors to prevent leakage.

Insulating coating 51 is placed over the surfaces of the magnets and the inner surface of band 41 in order to prevent short circuiting. This coating may comprise an enamel, varnish, or equivalent material.

The composite magnet comprising band 41 and pole pieces 40 and 42 is preferably of permanent type, made of Alnico or similar material although it could be an electro-magnet. The poles 42 are of like sign and poles 40 are of opposite sign. Magnetic flux will therefore extend from pole to pole as indicated by the arrows, the flux return being through the magnet base elements 39 and 43 and band 41 which forms part of the casing. The lower part of the casing 52 is attached to band 41 and is preferably made of insulating material such as ceramic, wood, plastic or the like. The upper casing has flared portion 53 to which pipe 54 leading from pump 55, of any suitable kind, is attached. Inlet pipe 56 leads from casing or vessel 52 to the pump. The pump may be driven by pulley 57 or otherwise. Pipe 54 and upper casing 53 may be of glass or other insulating material, if desired. The fluid can be dropped by gravity from pipe 54 into chamber 54a to cause separation, for insulation purposes, or it can be forced under pressure. The magnetic field elements can extend to the pump if desired.

The magnet poles are preferably arranged in a horizontal plane as indicated in Figure 2 and baffles 59 may be arranged beneath channel 44 so that fluid passing downward through the channel will be broken into discontinuous portions to prevent electrical connection between that fluid and the supply of fluid 58 in vessel 52. This fluid may be mercury or any electrically conducting liquid.

In operation, pulley 57 of pump 55 is rotated by means of a driven belt, not shown, so that mercury or other fluid 58 is drawn through pipe 56 and is forced through pipe 54 and down through channel 44 at relatively high velocity. The conducting fluid passing through the magnetic field or fields between the magnet poles generates an electromotive force or forces directed along the length of channel 44, as may be seen by viewing the flux directions indicated by the arrows. I have found that appreciable potential may be generated by flow of a conducting fluid across a magnetic field. The current can be utilized by connecting electrodes 47 and 49 in a suitable circuit.

The greater the velocity of flow of the fluid the greater will be the potential generated, and similarly, the stronger the magnetic field the greater will be the potential.

If desired, the discharge from channel 44 could be collected in buckets, traps or the like and could be periodically dumped to prevent connection with liquid 58. While a liquid is shown, an ionized gas or vapor could be used and electrical means for ionizing the vapor could be included.

The liquid that drops into chamber or vessel 52 is recirculated by the pump and a certain amount of cooling will take place in pipe 54 but special means such as a water bath or forced ventilation could be employed. This generator will provide a potential and current virtually without ripple.

The ends of the magnets could be rounded and the channel can be of any desired pattern. A series of circular channels could be used, with a separate pump and fluid supply for each channel, if necessary. The electromotive forces developed in each could be connected in series by suitable conductors. A plurality of magnetic units as illustrated could be connected electrically in series, care being taken to prevent short circuits.

The flux return for the magnet poles is shown as being coplanar but the return can be placed above or below the magnet poles and can be apertured to allow passage of the fluid.

Vessel or chamber 54a can be of the same cross section as the pattern of channel 44 in order to define the liquid conductor to better advantage and to prevent circulating currents.

Figure 3:
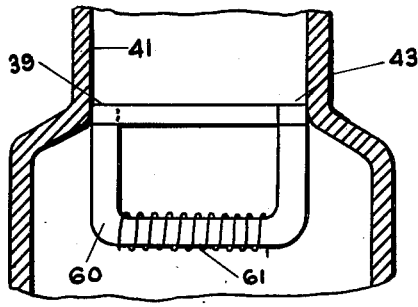
Figure 3 is a fragmentary elevation, in part section, showing a modified flux return for the magnet poles, for the device of Figure 2.

As shown in Figure 3, the flux return between magnet poles 39 and 43 is through iron or steel bar 60 which may be wound with magnetizing coil 61. This coil can be supplied with current from an external source or it can be connected in circuit with the electrodes 47 and 49 (Fig. 1). The fluid may flow around element 60 and coil 61.

Many other arrangements and changes of detail are possible without departing from the broad principles disclosed by this invention.

What I claim is:

1. In an electrical device, a magnet having one pole comprising a plurality of spaced substantially parallel elongated magnetizable fingers and having the other pole comprising a plurality of similar fingers interleaved with said first named fingers and oppositely directed with respect thereto, said fingers being of proper dimensions to form a continuous space from one end finger to another end finger, a contact terminal in said space adjacent one end thereof, another contact terminal in said space adjacent the other end thereof, a conduit for fluid surrounding said magnet, a reservoir for said fluid connected with said conduit, and pump means for withdrawing fluid from said reservoir and forcing it through said space in a direction substantially at right angles to the magnetic fields between said fingers.

2. In an electrical device, a magnet having one pole comprising a plurality of spaced substantially parallel elongated magnetizable fingers and having the other pole comprising a plurality of similar fingers interleaved with said first named fingers and oppositely directed with respect thereto, said fingers being of proper dimensions to form a continuous space from one end finger to another end finger, a contact terminal in said space adjacent one end thereof, another contact terminal in said space adjacent the other end thereof, a conduit for fluid surrounding said magnet, a reservoir for said fluid connected with said conduit, pump means for withdrawing fluid from said reservoir and forcing it through said space in a direction substantially at right angles to the magnetic fields between said fingers, and means between said magnet and said fluid reservoir for preventing continuous flow of said fluid.

3. Same as in claim 1, said magnet comprising a part of said conduit.

4. Same as in claim 1, said reservoir comprising insulating material.

5. Same as in claim 1, and means between said magnet and said pump for preventing continuous flow of said fluid.

ALBERT G. THOMAS.

REFERENCES CITED

The following references are of record in the file of this patent:

UNITED STATES PATENTS

| Number | Name | Date |
|---|---|---|
| 957,242 | Noeggerath | May 10, 1910 |
| 1,196,511 | Borger | Aug. 29, 1916 |
| 2,106,842 | Hague | Feb. 1, 1938 |
| 2,302,983 | Swallow | Nov. 24, 1942 |
| 2,412,247 | Bohn | Dec. 10, 1946 |

FOREIGN PATENTS

| Number | Country | Date |
|---|---|---|
| 7,670 | Great Britain | Of 1902 |
| 103,706 | Germany | June 26, 1899 |

OTHER REFERENCES

Theory and Calculation of Electrical Apparatus, by C. P. Steinmetz, pages 450 to 453, First edition, published 1907, McGraw-Hill Book Co., Inc., New York, New York.